United States Patent
Huang et al.

(10) Patent No.: US 10,742,428 B2
(45) Date of Patent: Aug. 11, 2020

(54) POWER OVER ETHERNET DEVICE

(71) Applicant: PEGATRON CORPORATION, Taipei (TW)

(72) Inventors: Chao-Wen Huang, Taipei (TW); Yu-Chung Chang, Taipei (TW); Feng-Liang Lai, Taipei (TW); Wen-Kai Tai, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/162,164

(22) Filed: Oct. 16, 2018

(65) Prior Publication Data

US 2019/0182057 A1    Jun. 13, 2019

(30) Foreign Application Priority Data

Dec. 8, 2017    (TW) .............................. 106143257 A

(51) Int. Cl.
| | |
|---|---|
| *H04L 12/10* | (2006.01) |
| *H04B 3/56* | (2006.01) |
| *H02J 3/02* | (2006.01) |
| *G06F 1/26* | (2006.01) |

(52) U.S. Cl.
CPC ................ *H04L 12/10* (2013.01); *G06F 1/26* (2013.01); *G06F 1/266* (2013.01); *H02J 3/02* (2013.01); *H04B 3/56* (2013.01)

(58) Field of Classification Search
CPC . H04L 12/10; G06F 1/266; H02J 3/02; H04B 3/56
USPC ......................................................... 375/258
See application file for complete search history.

(56) References Cited

U.S. PATENT DOCUMENTS

| | | | |
|---|---|---|---|
| 7,711,967 B2 | 5/2010 | Woo et al. | |
| 9,405,341 B2 | 8/2016 | Kao | |
| 2006/0132142 A1* | 6/2006 | Kabasawa | .......... G01R 31/2621 |
| | | | 324/500 |
| 2007/0041577 A1* | 2/2007 | Ghoshal | .................. H04L 12/10 |
| | | | 379/413 |
| 2007/0165548 A1* | 7/2007 | Woo | ........................ G06F 1/266 |
| | | | 370/283 |

FOREIGN PATENT DOCUMENTS

| | | | |
|---|---|---|---|
| CN | 101599839 | | 12/2009 |
| CN | 101599839 A | * | 12/2009 |
| CN | 101371492 | | 8/2012 |
| TW | I545915 | | 8/2016 |

* cited by examiner

*Primary Examiner* — Wednel Cadeau
(74) *Attorney, Agent, or Firm* — J.C. Patents

(57) ABSTRACT

A power over Ethernet device is provided. The power over Ethernet device includes a first Ethernet connector, an Ethernet transformer circuit, and a detection circuit. The first Ethernet connector is coupled to a second Ethernet connector of a network device via an Ethernet cable and has a first reserve pin and a second reserve pin. The Ethernet transformer circuit is coupled to the first Ethernet connector to provide a supply voltage to the Ethernet cable to transfer the supply voltage to the network device. The detection circuit receives the supply voltage and is coupled to the Ethernet transformer circuit, the first reserve pin, and the second reserve pin to provide a reference voltage to the first reserve pin and receives an identification voltage from the second reserve pin to determine whether the network device is a powered device.

7 Claims, 6 Drawing Sheets

POWER OVER ETHERNET DEVICE

CROSS REFERENCE TO RELATED APPLICATION

This application claims the priority benefit of Taiwan application serial no. 106143257, filed on Dec. 8, 2017. The entirety of the above-mentioned patent application is hereby incorporated by reference herein and made a part of specification.

BACKGROUND

Technical Field

The application relates to a power supply device, and more particularly, to a power over Ethernet device.

Related Art

A power over Ethernet (POE) device is an application technology in which power is provided via a network cable, and the specification and usage thereof are clearly defined by the IEEE 802.3AT/F, and the convenience thereof is also well known. For instance, the space of an external I/O can be reduced, such that product appearance can be more aesthetic and practical. However, since whether an external device is a power over Ethernet device needs to be detected, an integrated circuit (IC) and a circuitry occupying a large area are needed. The IC and the circuitry occupying a large are expensive and are not readily placed in a portable network device, such that the portable network device cannot utilize the function of power over Ethernet. Therefore, the power over Ethernet device requires a novel circuit design to be suitable for a portable network device.

SUMMARY

The application provides a power over Ethernet device that can determine whether a network device is a powered device via a simple circuit.

A power over Ethernet device of the application includes a first Ethernet connector, an Ethernet transformer circuit, and a detection circuit. The first Ethernet connector is coupled to a second Ethernet connector of a network device via an Ethernet cable and has a first reserve pin, a second reserve pin, a transfer pin group, and a receive pin group. The Ethernet transformer circuit is coupled to the first Ethernet connector to provide a supply voltage to the Ethernet cable via the transfer pin group and the receive pin group to deliver the supply voltage to the network device. The detection circuit receives the supply voltage and is coupled to the Ethernet transformer circuit, the first reserve pin, and the second reserve pin to provide a reference voltage to the first reserve pin and receives an identification voltage from the second reserve pin to determine whether the network device is a powered device. When the network device is a powered device, the detection circuit provides the supply voltage to the Ethernet transformer circuit.

Based on the above, the power over Ethernet device of an embodiment of the application transfers a reference voltage to the first reserve pin and determines whether a network device is a powered device according to an identification voltage received from the second reserve pin. Accordingly, the power over Ethernet device can simplify the method of determination, that is, the power over Ethernet device can determine via a simple circuit.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF THE EMBODIMENTS

Figure 1:
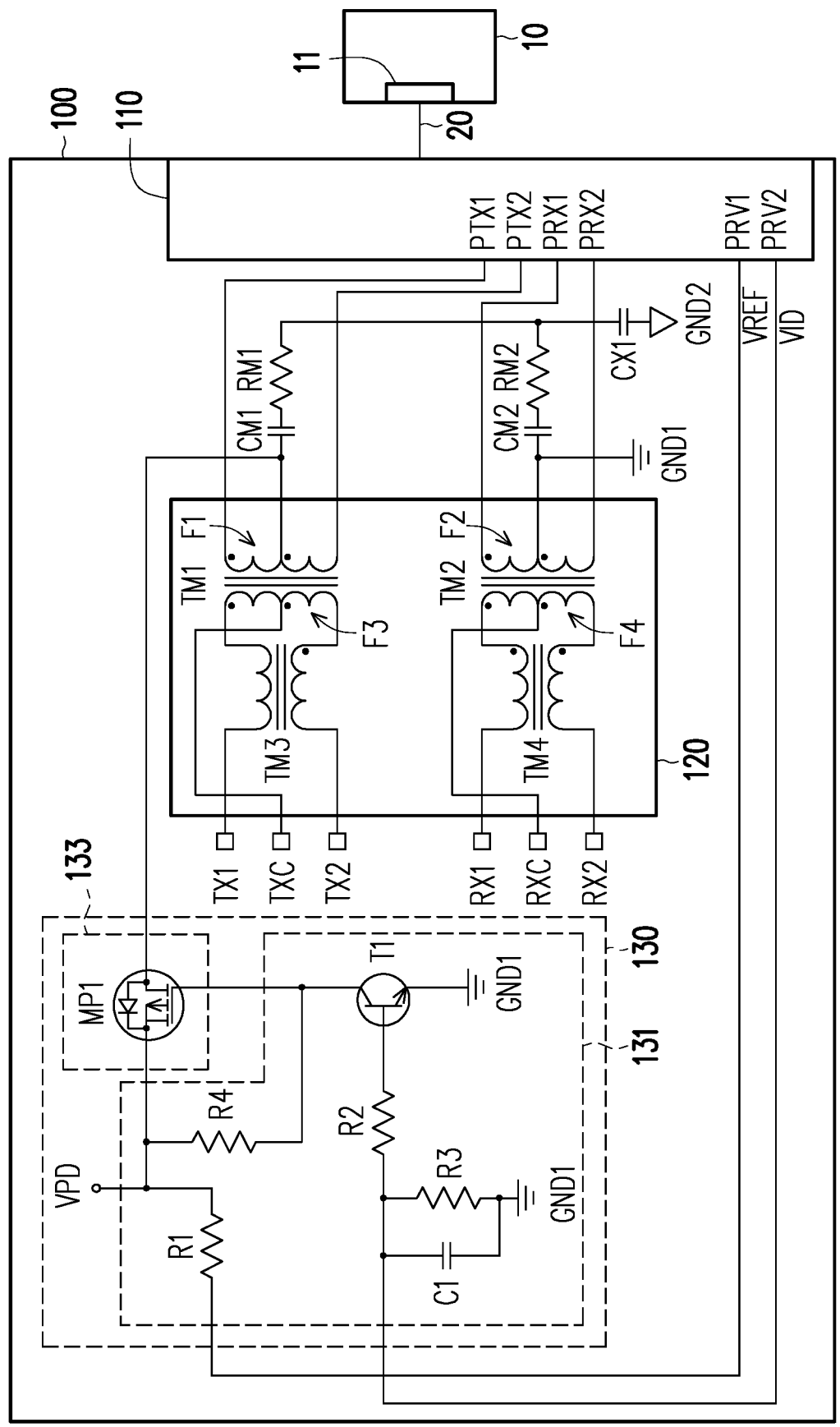
FIG. 1 is a system diagram of a power over Ethernet device according to an embodiment of the application.

FIG. 1 is a system diagram of a power over Ethernet device according to an embodiment of the application. Referring to FIG. 1, in the present embodiment, a power over Ethernet device 100 is coupled to a network device 10 via an Ethernet cable 20, and the power over Ethernet device 100 includes a first Ethernet network connector 110, an Ethernet transformer circuit 120, and a detection circuit 130. The first Ethernet connector 110 is coupled to a second Ethernet connector 11 of the network device 10 via the Ethernet cable 20. The first Ethernet connector 110 has a first reserve pin PRV1, a second reserve pin PRV2, a transfer pin group (such as including a first transfer pin PTX1 and a second transfer pin PTX2), and a receive pin group (such as including a first receive pin PRX1 and a second receive pin PRX2).

The Ethernet transformer circuit 120 is coupled to the first Ethernet connector 110 and configured to provide a supply voltage VPD to the Ethernet cable 20 via the first transfer pin PTX1, the second transfer pin PTX2, the first receive pin PRX1, and the second receive pin PRX2 to transfer the supply voltage VPD to the network device 10. The detection circuit 130 receives the supply voltage VPD and is coupled to the Ethernet transformer circuit 120, the first reserve pin PRV1, and the second reserve pin PRV2 to provide a reference voltage VREF to the first reserve pin PRV1 and receives an identification voltage VID from the second reserve pin PRV2 to determine whether the network device 10 is a powered device.

When the network device 10 is a powered device, the detection circuit 130 provides the supply voltage VPD to the Ethernet transformer circuit 120 and transfers the supply voltage VPD to the powered device via the Ethernet transformer circuit 120 and the Ethernet cable 20. When the network device 10 is not a powered device, the detection circuit 130 does not provide the supply voltage VPD to the Ethernet transformer circuit 120, that is, the supply voltage VPD is not transferred to the network device 10.

More specifically, when the network device 10 is a powered device, the first reserve pin PRV1 is coupled to the second reserve pin PRV2 via the Ethernet cable 20 and the second Ethernet connector 11, that is, the identification voltage VID is the same as the reference voltage VREF. In other words, when the network device 10 is a powered device, the reference voltage VREF is returned to the detection circuit 130 to trigger the detection circuit 130 to provide the supply voltage VPD to the Ethernet transformer circuit 120.

The Ethernet transformer circuit 120 includes a first transformer TM1 and a second transformer TM2, and transformers TM3 and TM4. The first transformer TM1 has a first side F1 and a third side F3, and the second transformer TM2 has a second side F2 and a fourth side F4. The first terminal of the first side F1 is coupled to the first transfer pin PTX1, the first middle terminal of the first side F1 is configured to receive the supply voltage VPD, and the second terminal of the first side F1 is coupled to the second transfer pin PTX2, wherein the first middle terminal of the first side F1 is coupled to a ground terminal GND2 via a capacitance CM1, a resistor RM1, and a capacitance CX1 connected in series. The third terminal of the second side F2 is coupled to the first receive pin PRX1, the second middle terminal of the second side F2 is coupled to a ground voltage GND1, and the fourth terminal of the second side F2 is coupled to the second receive pin PRX2, wherein the second middle terminal of the second side F2 is coupled to the ground terminal GND2 via a capacitance CM2, a resistor RM2, and a capacitance CX1 connected in series, and the receive voltage GND1 is different from the receive voltage GND2.

The fifth terminal of the third side F3 receives a first transfer signal TX1 via a side of the transformer TM3, the third middle terminal of the third side F3 receives a transfer reference voltage TXC, and the sixth terminal of the third side F3 receives a second transfer signal TX2 via another side of the transformer TM3. The seventh terminal of the fourth side F4 provides a first receive signal RX1 via a side of the transformer TM4, the fourth middle terminal of the fourth side is coupled to the receive reference voltage TXC, and the eighth terminal of the fourth side provides a second receive signal RX2 via another side of the transformer TM4.

The detection circuit 130 includes a device determination circuit 131 and a voltage transfer circuit 133. The device determination circuit 131 is coupled to the first reserve pin PRV1 and the second reserve pin PRV2 to provide the reference voltage VREF to the first reserve pin PRV1 and receives the identification voltage VID from the second reserve pin PRV2 to determine whether the network device 10 is a powered device. When the network device 10 is a powered device, a transfer control signal STC is enabled; when the network device 10 is not a powered device, the transfer control signal STC is disabled.

The voltage transfer circuit 133 receives the supply voltage VPD and is coupled to the device determination circuit 131 and the Ethernet transformer circuit 120. When the transfer control signal STC is enabled, the supply voltage VPD is transferred to the Ethernet transformer circuit 120; when the transfer control signal STC is disabled, the transfer of the supply voltage VPD to the Ethernet transformer circuit 120 is stopped.

More specifically, the device determination circuit 131 includes a first resistor R1, a second resistor R2, a third resistor R3, a fourth resistor R4, a first capacitance C1, and a first junction transistor T1. The first resistor R1 is coupled between the supply voltage VPD and the first reserve pin PRV1. The first junction transistor T1 has a collector providing the transfer control signal STC, a base, and an emitter coupled to the ground voltage GND1. The second resistor R2 is coupled between the base of the first junction transistor T1 and the second reserve pin PRV2. The third resistor R3 is coupled between the second reserve pin PRV2 and the ground voltage GND1. The first capacitance C1 is coupled between the second reserve pin PRV2 and the ground voltage GND1. The fourth resistor R4 is coupled between the supply voltage VPD and the collector of the first junction transistor T1. The voltage transfer circuit 133 includes a PMOS transistor MP1. The PMOS transistor MP1 has a source receiving the supply voltage VPD, a gate receiving the transfer control signal STC, and a drain coupled to the Ethernet transformer circuit 120.

In the design of a small signal circuit, since the requirements of the drive capability are lower, i.e., the current value is about several milliamps to several hundred milliamps, the resistor value is generally designed at several kiloohms, that is, the values of the first resistor R1, the second resistor R2, the third resistor R3, and the fourth resistor R4 are generally designed at several kiloohms. In an embodiment, the first resistor R1 is 7.5 kiloohms, the second resistor R2 is 2.49 kiloohms, the third resistor R3 is 4.7 kiloohms, and the fourth resistor R4 is 1 kiloohm.

Figure 2A:
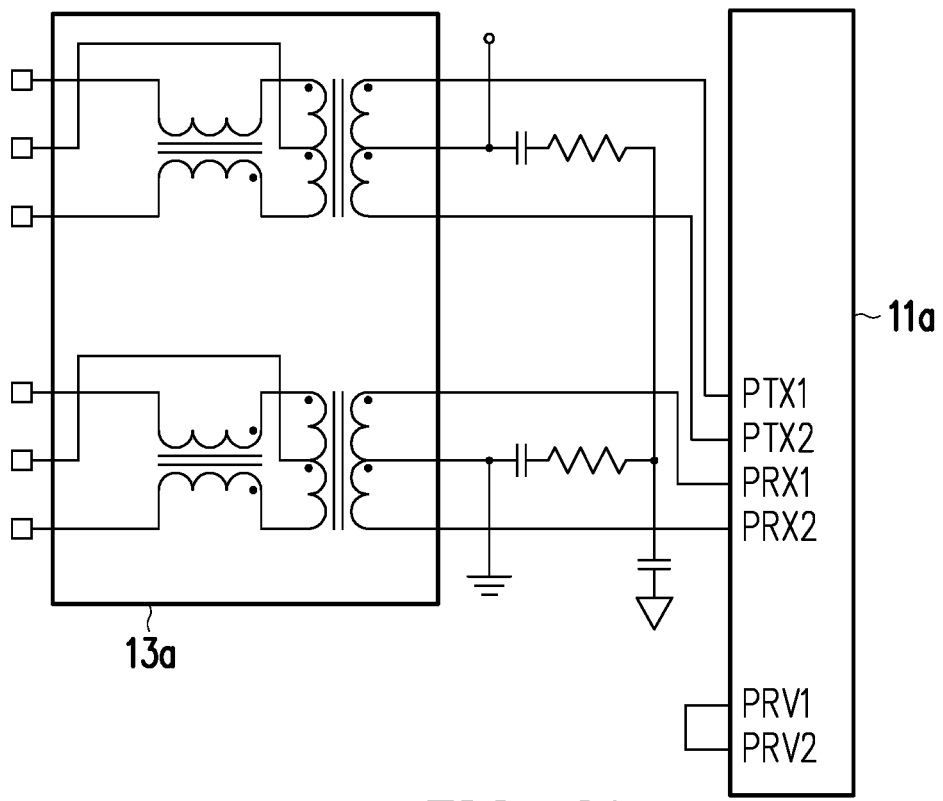
FIG. 2A is a system diagram of a power over Ethernet device coupled to a powered device according to an embodiment of the application.
Figure 2B:
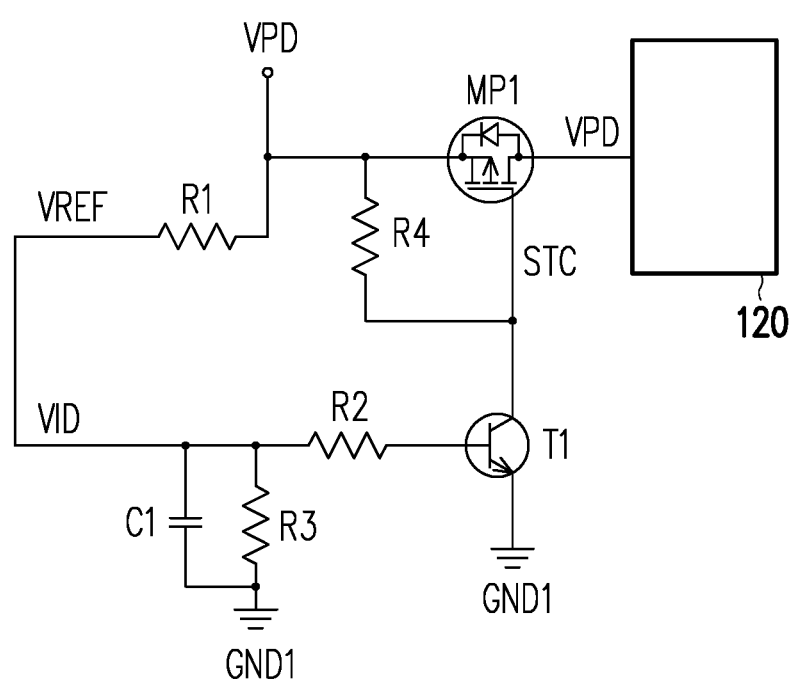
FIG. 2B is an equivalent diagram of a detection circuit of a power over Ethernet device coupled to a powered device according to an embodiment of the application.

FIG. 2A is a system diagram of a power over Ethernet device coupled to a powered device according to an embodiment of the application. FIG. 2B is an equivalent diagram of a detection circuit of a power over Ethernet device coupled to a powered device according to an embodiment of the application. Referring to FIG. 1, FIG. 2A, and FIG. 2B, in the present embodiment, a network device 10a is a powered device, and a second Ethernet connector 11a is substantially the same as the first Ethernet connector 110, but the first reserve pin PRV1 of the second Ethernet connector 11a is coupled to the second reserve pin PRV2, and the second Ethernet connector 11a is coupled to an Ethernet transformer circuit 13a. At this point, since the first reserve pin PRV1 and the second reserve pin PRV2 of the second Ethernet connector 11a are respectively coupled to the first reserve pin PRV1 and the second reserve pin PRV2 via the Ethernet cable 20, the first reserve pin PRV1 of the first Ethernet connector 110 is coupled to the second reserve pin PRV2.

Next, the supply voltage VPD is divided by the first resistor R1, the second resistor R2, and the third resistor R3 and provided to the base of the first junction transistor T1 to turn on the first junction transistor T1. Since the emitter current reduces the voltage level of the transfer control signal STC, the voltage level of the transfer control signal STC approaches the ground voltage GND1, i.e., the enabled transfer control signal STC. Moreover, the enabled transfer control signal STC causes the PMOS transistor MP1 to be turned on, and the supply voltage VPD is transferred to the Ethernet transformer circuit 120 via the enabled PMOS transistor MP1.

Figure 3A:
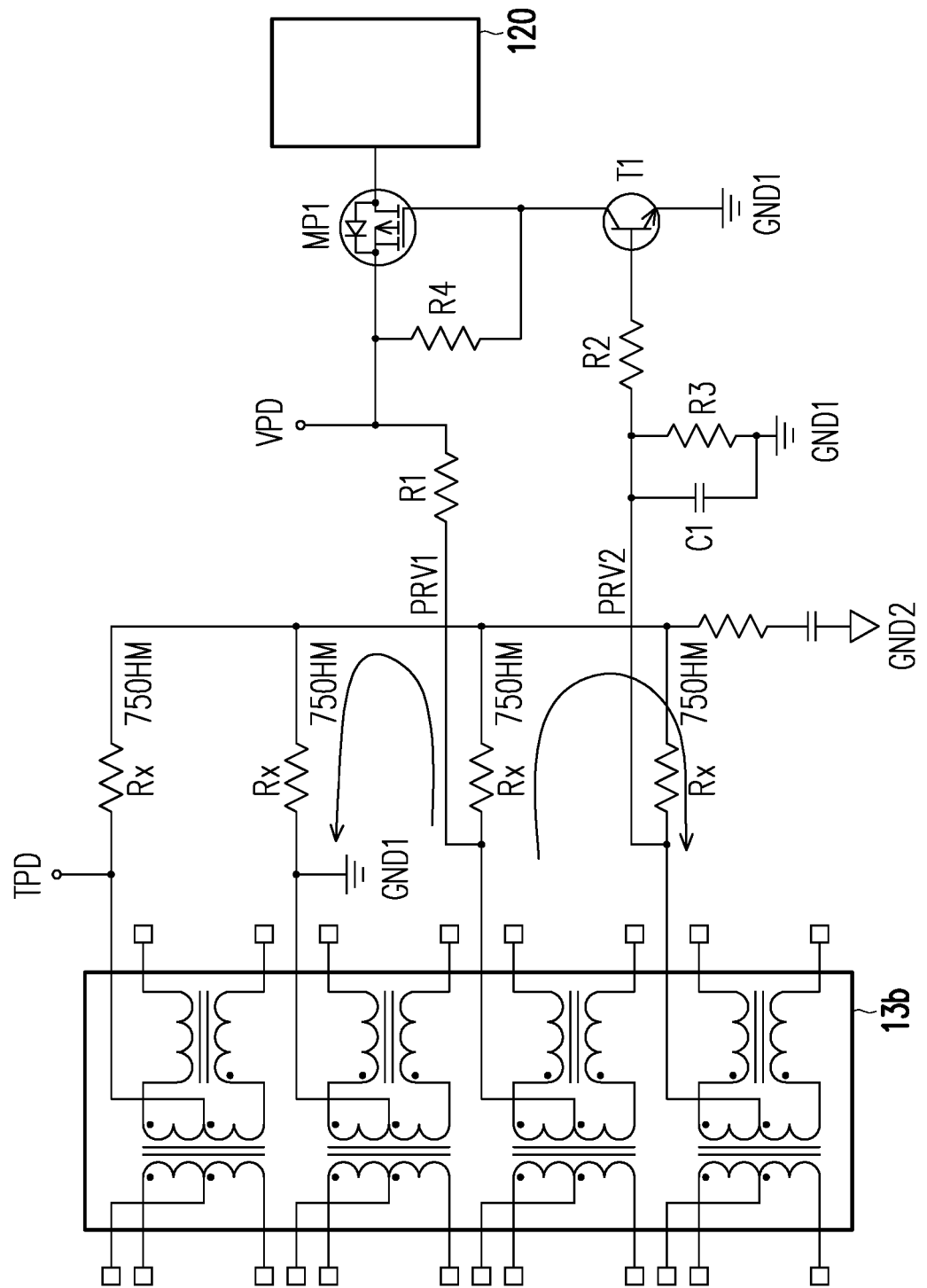
FIG. 3A is a system diagram of a power over Ethernet device coupled to a network according to an embodiment of the application.
Figure 3B:
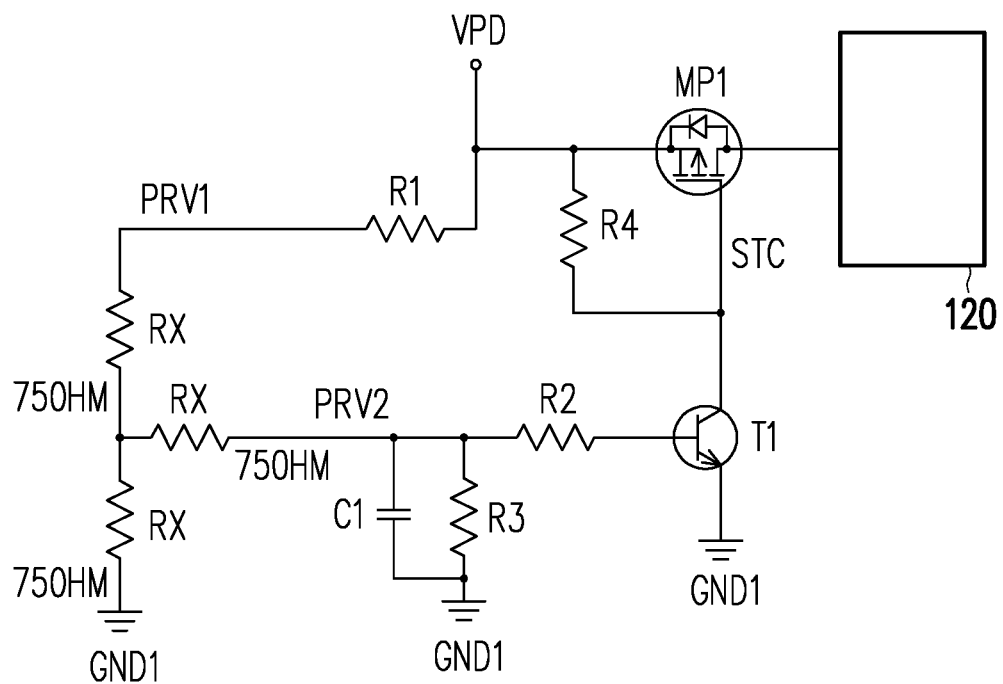
FIG. 3B is an equivalent diagram of a detection circuit of a power over Ethernet device coupled to a network device according to an embodiment of the application.

FIG. 3A is a system diagram of a power over Ethernet device coupled to a network according to an embodiment of the application. FIG. 3B is an equivalent diagram of a detection circuit of a power over Ethernet device coupled to a network device according to an embodiment of the application. Referring to FIG. 1, FIG. 3A, and FIG. 3B, in the present embodiment, the network device 10 is a circuit structure with a with 75-ohm connection. That is, a plurality of middle terminals at a side of a plurality of transformers in an Ethernet transformer circuit 13b of the network device 10 are respectively coupled to one another via a resistor Rx, and a plurality of middle terminals at a side of a plurality of transformers in the Ethernet transformer circuit 13b are respectively coupled to a supply terminal TPD, the ground voltage GND1, the first reserve pin PRV1, and the second reserve pin PRV2.

At this point, since the first resistor R1 and two resistances Rx are connected in series between the supply voltage VPD and the ground voltage GND1, i.e., the voltage drop of the resistances Rx is lower and the base of the first junction transistor T1 is too low, such that the first junction transistor T1 cannot operating. Since the fourth resistor R4 transfers the supply voltage VPD to the collector of the first junction transistor T1, the voltage level of the transfer control signal STC is increased, such that the voltage level of the transfer control signal STC approaches the supply voltage VPD, i.e., the disabled transfer control signal STC. Moreover, the disabled transfer control signal STC results in the cutoff of the PMOS transistor MP1, and the supply voltage VPD cannot be transferred to the Ethernet transformer circuit 120 via the PMOS transistor MP1, i.e., the power over Ethernet device 100 does not transfer the supply voltage VPD so as to prevent electric power from burning the network device 10.

Figure 4A:
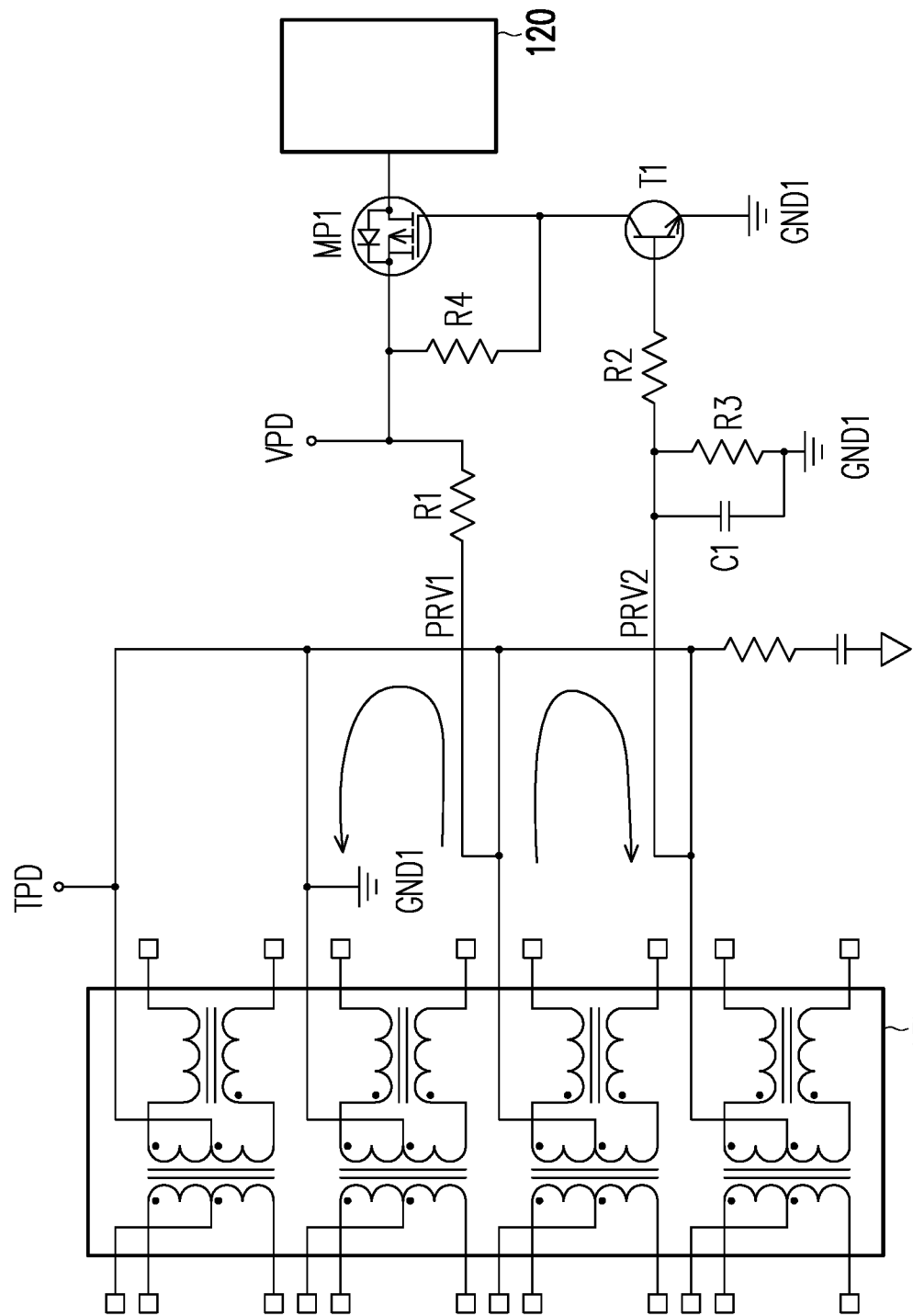
FIG. 4A is a system diagram of a power over Ethernet device coupled to a network according to an embodiment of the application.
Figure 4B:
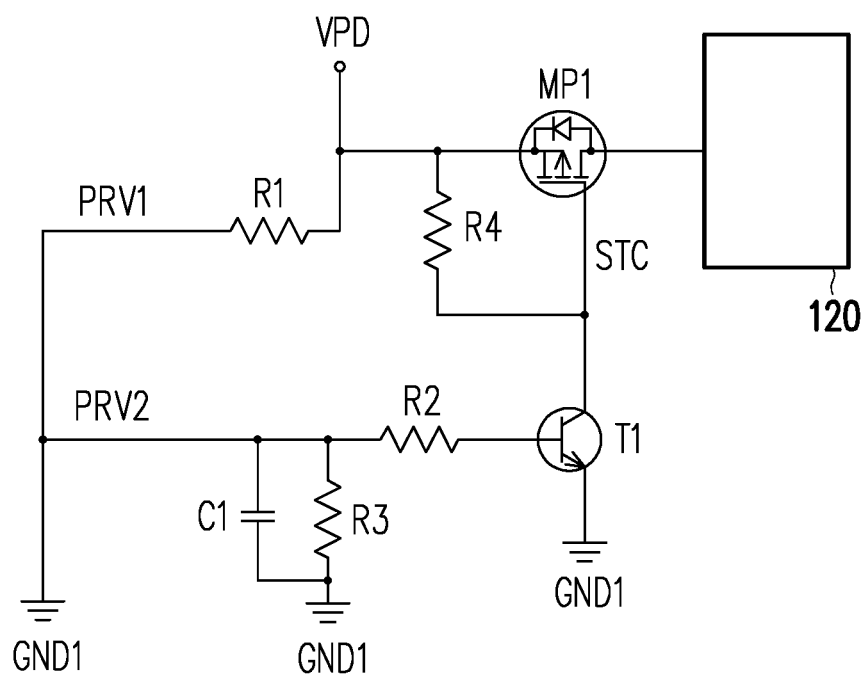
FIG. 4B is an equivalent diagram of a detection circuit of a power over Ethernet device coupled to a network device according to an embodiment of the application.

FIG. 4A is a system diagram of a power over Ethernet device coupled to a network according to an embodiment of the application. FIG. 4B is an equivalent diagram of a detection circuit of a power over Ethernet device coupled to a network device according to an embodiment of the application. Referring to FIG. 1, FIG. 4A, and FIG. 4B, in the present embodiment, the network device 10 is a circuit structure with a 0 ohm connection. That is, a plurality of middle terminals at a side of a plurality of transformer in the Ethernet transformer circuit 13b of the network device 10 are respectively coupled to one another via a wire, and a plurality of middle terminals at a side of a plurality of transformers in the Ethernet transformer circuit 13b are respectively coupled to the supply terminal TPD, the ground voltage GND1, the first reserve pin PRV1, and the second reserve pin PRV2.

At this point, since the junction of the first resistor R1 and the second resistor R2 (i.e., the first reserve pin PRV1 and the second reserve pin PRV2) is coupled between the ground voltage GND1, the base of the first junction transistor T1 is the ground voltage GND1, and therefore the first junction transistor T1 cannot operating. Since the fourth resistor R4 transfers the supply voltage VPD to the collector of the first junction transistor T1, the voltage level of the transfer control signal STC is increased, such that the voltage level of the transfer control signal STC approaches the supply voltage VPD, i.e., the disabled transfer control signal STC. Moreover, the disabled transfer control signal STC results in the cutoff of the PMOS transistor MP1, and the supply voltage VPD cannot be transferred to the Ethernet transformer circuit 120 via the PMOS transistor MP1, i.e., the power over Ethernet device 100 does not transfer the power so as to prevent electric power from burning the network device 10.

Based on the above, the power over Ethernet device of an embodiment of the application transfers a reference voltage to the first reserve pin and determines whether a network device is a powered device according to an identification voltage received from the second reserve pin. Accordingly, the power over Ethernet device can simplify the method of determination, that is, the power over Ethernet device can determine via a simple circuit.

Although the application has been described with reference to the above embodiments, it will be apparent to one of ordinary skill in the art that modifications to the described embodiments may be made without departing from the spirit of the application. Accordingly, the scope of the application is defined by the attached claims not by the above detailed descriptions.

What is claimed is:

1. A power over Ethernet device, comprising:
a first Ethernet connector coupled to a second Ethernet connector of a network device via an Ethernet cable and having a first reserve pin, a second reserve pin, a transfer pin group, and a receive pin group;
an Ethernet transformer circuit coupled to the first Ethernet connector to provide a supply voltage to the Ethernet cable via the transfer pin group and the receive pin group to deliver the supply voltage to the network device; and
a detection circuit receiving the supply voltage and coupled to the Ethernet transformer circuit, the first reserve pin, and the second reserve pin, wherein the detection circuit is configured to provide a reference voltage to the first reserve pin and receives an identification voltage from the second reserve pin to determine whether the network device is a powered device, when the network device is the powered device, the detection circuit provides the supply voltage to the Ethernet transformer circuit, and when the network is not the powered device, the supply voltage is not provided to the Ethernet transformer circuit,
wherein the detection circuit comprises:
a device determination circuit coupled to the first reserve pin and the second reserve pin and configured to enable a transfer control signal when the network device is the powered device and disable the transfer control signal when the network device is not the powered device,
wherein the device determination circuit comprises:
a first resistor coupled between the supply voltage and the first reserve pin;
a first junction transistor having a collector providing the transfer control signal, a base, and an emitter coupled to a ground voltage;
a second resistor coupled between the base and the second reserve pin;
a third resistor coupled between the second reserve pin and the ground voltage;
a first capacitance coupled between the second reserve pin and the ground voltage; and
a fourth resistor coupled between the supply voltage and the collector; and
a voltage transfer circuit receiving the supply voltage, coupled to the device determination circuit and the Ethernet transformer circuit, and configured to transfer the supply voltage to the Ethernet transformer circuit when the transfer control signal is enabled and stop transferring the supply voltage to the Ethernet transformer circuit when the transfer control signal is disabled.

2. The power over Ethernet device of claim 1, wherein when the identification voltage is the same as the reference voltage, the network device is determined to be the powered device.

3. The power over Ethernet device of claim 1, wherein the voltage transfer circuit comprises:

a PMOS transistor having a source receiving the supply voltage, a gate receiving the transfer control signal, and a drain coupled to the Ethernet transformer circuit.

4. The power over Ethernet device of claim 1, wherein the transfer pin group comprises a first transfer pin and a second transfer pin, the receive pin group comprises a first receive pin and a second receive pin, and the Ethernet transformer circuit comprises:

a first transformer having a first side, wherein a first terminal of the first side is coupled to the first transfer pin, a first middle terminal of the first side is configured to receive the supply voltage, and a second terminal of the first side is coupled to the second transfer pin; and a second transformer having a second side, wherein a third terminal of the second side is coupled to the first receive pin, a second middle terminal of the second side is coupled to the ground voltage, and a fourth terminal of the second side is coupled to the second receive pin.

5. The power over Ethernet device of claim 2, wherein in the powered device, the first reserve pin is coupled to the second reserve pin via the Ethernet cable and the second Ethernet connector.

6. The power over Ethernet device of claim 4, wherein the first transformer further has a third side, wherein a fifth terminal of the third side receives a first transfer signal, a third middle terminal of the third side receives a transfer reference voltage, and a sixth terminal of the third side receives a second transfer signal.

7. The power over Ethernet device of claim 4, wherein the second transformer further has a fourth side, wherein a seventh terminal of the fourth side provides a first receive signal, a fourth middle terminal of the fourth side is coupled to a receive reference voltage, and an eighth terminal of the fourth side provides a second receive signal.

\* \* \* \* \*